Roy A. Keir
*INVENTOR.*
*BY* Byard G. Nilsson
Atty.

Roy R. Keir
INVENTOR.

BY Byard G. Nilsson
Atty.

101101 x 001101 = 001001001
45 13 = 585

| REGISTER | VALUE | INSTRUCTION | REGISTER | VALUE | MODE |
|---|---|---|---|---|---|
| $R_5$ | 001101 | ADD, SHIFT 2 | $R_1$ | 000000000000 | ZERO |
| | | | | 101101 | |
| $C_2$ | SHIFT | | | 101101000000 | |
| | | | | SHIFT | |
| $R_4$ | 000011 | COMPLEMENT | $R_2$ | 001011010000 | ZERO |
| $C_1$ | | | | COMPLEMENT | |
| $R_5$ | 000011 | ADD, SHIFT 2 CHANGE MODE | $R_1$ | 110100101111 | ZERO |
| | | | | 101101 1 | 52 |
| $C_2$ | SHIFT | | | 100001110000 | |
| | | | | SHIFT | 54 |
| $R_4$ | 000000 | COMPLEMENT | $R_2$ | 001000011100 | ONE 55 |
| $C_1$ | | | | COMPLEMENT | |
| $R_5$ | 000000 | ADD, SHIFT 2 ALTER MODE | $R_1$ | 110111100011 | ONE 58 |
| | | | | 101101 1 | |
| $C_2$ | | | | 100100100100 | 60 |
| | | | | SHIFT | 62 |
| $R_4$ | 000000 | HALT | $R_2$ | 001001001000 | ZERO |

Fig. 3

Roy A. Keir
INVENTOR.
BY Byard G. Nilsson
Atty.

United States Patent Office 3,116,411
Patented Dec. 31, 1963

3,116,411

BINARY MULTIPLICATION SYSTEM UTILIZING A ZERO MODE AND A ONE MODE

Roy A. Keir, Inglewood, Calif., assignor, by mesne assignments, to Control Data Corporation, Minneapolis, Minn., a corporation of Minnesota Filed June 15, 1959, Ser. No. 820,426
8 Claims. (Cl. 235—164)

The present invention relates to a multiplication system for performing certain operations in accordance with a pre-established pattern to develop a digital numerical value representative of the product of a pair of other numerical values.

According to the normal operation of multiplying a pair of numbers, each of which contains a plurality of orders or characters, each individual character of the multiplier is individually used to multiply the multiplicand and thereby develop a plurality of partial products. The partial products are totaled or accumulated to produce the final product. As the individual characters of the multiplier are considered, the simplest operation occurs when a zero character is encountered. Upon the occurrence of a zero in the multiplier, the remaining partial products (to be developed) are simply shifted to the left by one order. Of course, when a digit other than zero is encountered, the product of such digit and the multiplicand is added to the accumulation of partial products in proper shifted significance. As a result, encountering a digit (character other than zero) requires a multiplication, a shift operation, and an addition; while the occurrence of a zero in the multiplier requires only a shift operation be performed. Normally, the shift operation alone is most easily performed in manual computation, and is most rapidly performed in machine computation.

In general, binary codes have come into widespread use in automatic computing machines. In a binary code, only two digital characters exist, i.e., one and zero. Therefore, in automatic computing machines which employ binary-code digital representation a substantial number of zero characters exist. As indicated above, in the multiplication of a pair of numbers, the zero character of the multiplier can be handled more rapidly than the one characters, because the former command simply a shift operation.

The primary object of the present invention is to provide an improved system of multiplying numerical values, wherein an increased number of shifting operations are performed by alternating between two modes of operation in accordance with the characters of the multiplier which are to be next-considered.

Other and incidental objects of the present invention will become apparent from consideration of the following in conjunction with the drawings in which:

FIGURE 3 is a chart employed to explain the operation of the system of FIGURE 2.

Figure 1:
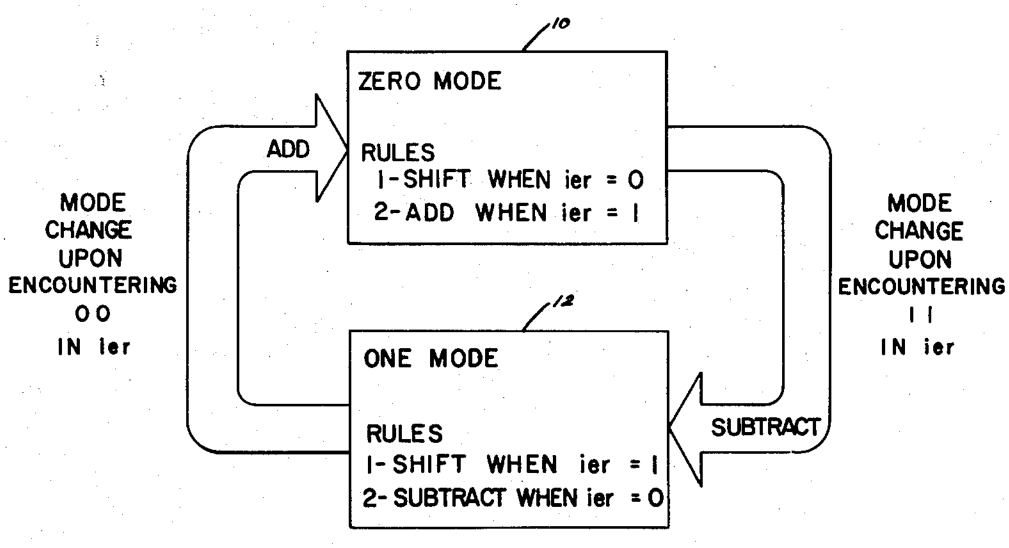
FIGURE 1 is a diagrammatic representation of the system of multiplication of the present invention.

The normal multiplication operation is usually considered as:

$$\text{Multiplicand} \times \text{Multiplier} = \text{Product}$$

Now consider, for example, that the multiplier is a binary-coded value, 1111; so that the operation becomes:

$$\text{Multiplicand} \times 1111 = \text{Product}$$

In the above equation, the term 1111 may be seen to be equal to 10000—00001; therefore:

$$\text{Multiplicand} \times (10000-0001) = \text{Product}$$

Rearranging the terms of the above equation produces:

$$(\text{Multiplicand} \times -1) + (\text{Multiplicand} \times 10000) = \text{Product}$$

Considering the above equation, it may be seen that by manipulation, a multiplier containing four ones may be reduced to a multiplier containing only two ones. Therefore, by performing similar manipulations a system of multiplying is described herein wherein the laborious time-consuming operations commanded by a one in the multiplier are significantly reduced in number.

From a consideration of the above, it may be seen, that in multiplying a pair of binary numbers, if a string or series of zeros is encountered, they may be skipped by providing appropriate shift operations in the accumulated partial product. In a similar manner, if a string or series of ones is encountered in the multiplier, they may be shifted over by subtracting the multiplicand from the accumulated partial product; and thereafter, adding the multiplicand to the accumulated partial product upon encountering a zero in the multiplier.

The present invention employs these principles to provide a system of multiplication having two modes. One of the modes will be termed the zero mode and coincides substantially to the normal mode of operation for multiplying binary numbers. That is, according to a zero mode of operation each one character encountered in the multiplier commands the addition of the multiplicand to the accumulation of partial products. The occurrence of zero characters in the multiplier simply commands a shift operation and nothing is added to the accumulation of partial products.

The other mode of operation according to the present invention is termed the one mode. While operating in the one mode, the occurrence of one characters in the multiplier commands simply a shift operation with no change in the accumulation of partial products. However, upon encountering a zero character in the multiplier, during operation in the one mode, the multiplicand is subtracted from the accumulation of partial products.

The determination of which of the modes of operation is faster, depends upon the ratio of zeros to ones in the multiplier. If the multiplier contains an abundance of zero characters, then the zero mode of operation is faster because more of the characters in the multiplier can be accounted for by a simple shift operation. However, if the multiplier contains an abundance of ones, then the one mode of operation is faster because it includes more of the simple shifting operations.

A multiplication system could be constructed which would determine the relative number of ones and zeros and thereby select either the zero mode of operation or the one mode of operation to reduce the time interval required for the multiplication to be performed. However, large random numbers often contain a near-equal distribution of ones and zeros. Therefore one mode of operation would be essentially as fast an another when such numbers appear as the multiplier. Furthermore, a significant time interval would be required to determine the relative number of one and zero characters, which interval would add to the overall multiplication time. To avoid these disadvantages, the present invention proposes a system which is capable of operating in either mode depending upon the characters in the multiplier which are to be considered next. That is, the present invention contemplates a system capable of operating in either the one mode or the zero mode, depending upon the content of some predetermined number of characters which are the next sequence of characters to be operated upon in the multiplier.

In a system which alternately employs the different modes of operation, i.e., the one mode and the zero mode, certain operations must be performed to effect the change from one mode to the other. In general, to change from the zero mode to the one mode, it is necessary to subtract the multiplicand from the accumulation of partial products. The change from the one mode back to the zero mode is accomplished by adding the multiplicand to the accumulation of partial products. A diagrammatic summary of these operations appears in FIGURE 1.

A block 10 indicates the zero mode of operation in which the system normally starts. According to the zero mode of operation, the characters of the multiplier are considered in sequence from the least-significant to the most-significant and depending upon what these characters are, certain operations are performed. Specifically, the occurrence of a zero character indicates that the character may be accounted for by simply shifting the accumulation of partial products so that the next value is added in a higher-order of significance. Upon encountering a one character in the multiplier, the shifting operation described above is performed and the multiplicand is added to the accumulation of partial products in increased significance.

The rules of operation in the one mode are indicated in a block 12 in FIGURE 1 and are the converse of the rules for the zero mode.

The multiplication operation may be initiated in the zero mode; then, upon encountering a series or string of two or more ones, the mode is changed to the one mode and there remains until a string of at least two zeros is encountered. Then, upon encountering a string of at least two zeros while in the one mode, the mode of operation is changed back to the zero mode. A very simple numerical example may best serve to illustrate the operation of the system. Assume the simple multiplication of:

$$00001 \times 01110$$

Normally, the above multiplication would be performed as follows:

```
00001
01110
-----
    0
   1
  1
 1
0
-----
01110
```

In performing the above operation according to the system of the present invention, the arithmetic operation would be performed as follows:

```
00001
01110
    1
ī−1
  0
 0
1
-----
01110
```

According to the above operation, the least-significant character of the multiplier is a zero and therefore counts for a zero in the partial product. Following the least-significant character of the multiplier, there are a string of three ones; therefore, in accordance with the rules set forth in FIGURE 1, the mode of operation is changed to a one mode and to effect the change the multiplicand is subtracted from the partial product. The following one characters in the string are then accounted for simply by a shift operation. On leaving the string of ones, which would occur upon encountering a pair of zero characters, the operation returns to the zero mode and the multiplicand is added to the accumulation of partial products in the proper significance. It is to be noted, that invariably in scanning through the multipler, orders are reached which have greater significance than the entire number; therefore, zeros are contained in these higher orders and therefore the multiplication operation always returns to the zero-mode operation.

In considering the above example, it is to be noted that by performing the simple multiplication in accordance with the system of the present invention, only two partial products are additively combined. Whereas, in performing the above multiplication in a conventional manner, three partial products are additively combined. As previously stated, in view of the fact that the addition operation is responsible for a considerable portion of the time consumed in the multiplication operation, it may be seen that the time may be significantly reduced by employing the system of the present invention.

Figure 2:
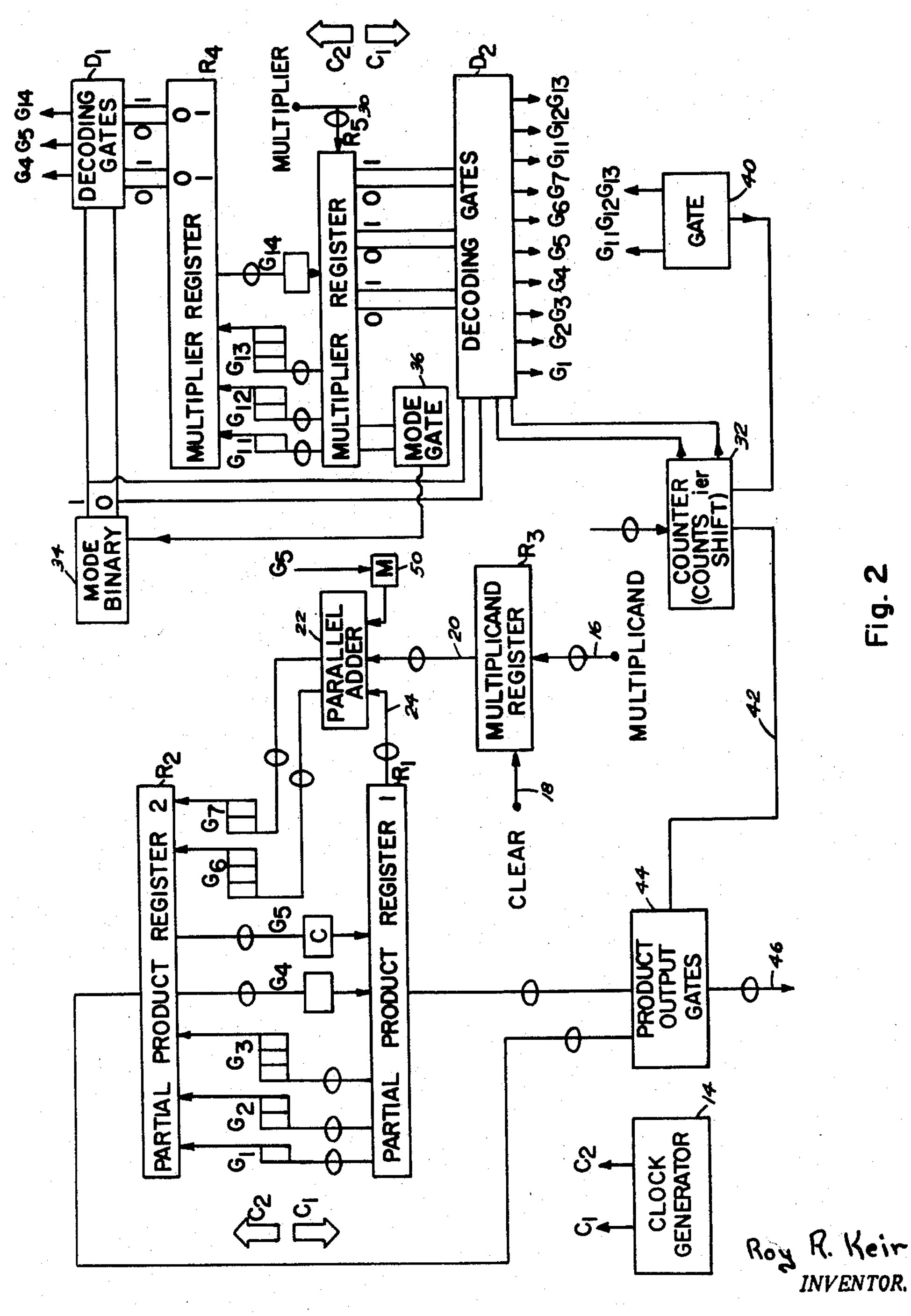
FIGURE 2 is a diagrammatic representation of a multiplier system constructed in accordance with the present invention.

Reference will now be had to FIGURE 2, a diagrammatic representation of the system constructed in accordance with the principle of the present invention. The system of FIGURE 2 includes a register R1 (center left) which is capable of simultaneously receiving and registering a plurality of parallel binary signals representative of the accumulation of partial products. The register R1 is connected to a register R2 through a plurality of cables, each cable comprising a plurality of conductors for transferring a parallel numerical value between the registers. In the figure, a cable is designated by a line surrounded by a small circle. Each of the groups of parallel paths interconnecting the registers R1 and R2 contain gate circuits which must be qualified by a signal in order to permit signals to flow between the registers R1 and R2. The gate circuits interconnecting the registers R1 and R2 are considered in detail hereinafter; however, it is to be noted that the movement of number-representing signals from the register R1 to the register R2 occurs during the interval of a clock pulse C2 from a clock generator 14. The transfer of signals from the register R2 to R1 occurs during the clock pulse C1. The connections from the clock generator 14 to the registers R1 and R2, and gate circuits are not shown in the interests of preserving the legibility of the drawing.

The multiplicand, as represented by a plurality of binary signals is registered in a register R3 (center of drawing) through a cable 16. The multiplicand signals remain in the register R3 throughout the multiplication process and the register is cleared only upon the application of a clear signal to the register through a line 18. The binary signals registered in the register R3 are continuously applied through a cable 20 to a parallel adder 22. The parallel adder 22 is also connected to the register R1 through a cable 24.

A pair of registers R4 and R5 (right side of drawing) serve to store the multiplier binary signals which are transferred between these registers during operation. The registers R4 and R5 are interconnected by a plurality of parallel paths (cables) which are variously connected to impart a predetermined shift to the signals with respect to the registers.

The registers R4 and R5 exchange information under control of signals from the clock generator 14, in the same manner as the registers R1 and R2. Signals from the register R5 are transferred to the register R4 during the clock signal C2. Signals from the register R4 are transferred to the register R5 during the interval of clock signal C1. Of course, each register is cleared prior to receiving signals. As before, the individual connections from the clock generator 14 to the gates between the registers R4 and R5 and the registers themselves have been omitted in the interests of preserving the drawing legible. The multiplier binary signals ane entered in the register R5 through a cable 30.

The less-significant digits or characters of the multiplier are observed after each operation to determine the next operation. Specifically, with each occurrence of a clock signal C2, the binary digit of the multiplier and the accumulated partial product move to the upper registers and undergo a predetermined amount of displacement or shifting. The amount of shifting imparted to these digit signals depends upon the least significant digits in the multiplier register R5. Specifically, the chart set out below indicates the various shifting operations and arithmetic operations, along with the orders to command a change in mode (when present) which are indicated by the three least significant digits registered in the register R5.

*Zero Mode*

Shift 1=010+110
Shift 2=100
Shift 3=000

Add and shift 2=101
Add and shift 3=001

Subtract and shift 2=011=change mode
Subtract and shift 3=111=change mode

The chart indicates the various operations to be performed in accordance with the logical consideration of the three least-significant characters in the register R5 during the zero mode. In a similar fashion, a set of logical equations are presented in the following chart indicative of these operations when the system operates in the one mode.

Shift 1=(101+001)
Shift 2=011
Shift 3=111

Add and shift 2=100=change mode
Add and shift 3=000=change mode

Subtract and shift 2=010
Subtract and shift 3=110

The decoding of the least-significant characters in the register R5 is performed by a decoding gate system D2 which serves to generate gating signals G1, G2, G3, G4, G5, G6, G7, G11, G12, and G13. The gate system D2 is also connected to a counter 32 which tallies the number of shifts of the multiplier in the register R5. The decoding gates D2 are also connected to a mode binary 34 the state of which is indicative of the mode in which the system is operating. The mode binary 34 is controlled in accordance with the above chart by the least-significant digits in the multiplier register R5. The decoding of digits in the register R5 which command a change in mode is performed by a mode decoding gate network 36 in accordance with the above charts.

The shift counter 32 is advanced by signals from the decoding gates D2 which indicate a predetermined amount of shift. These signals G11, G12, and G13 are applied through a gate 40 which advances the counter 32 either one, two or three digits in accordance with the signals received.

Considering the decoding gate system D2 in detail, the operation thereof is defined by the following chart:

*Decoding Gates D2*

G1=C2 (zero mode)·(010+110) +(one mode)(101+001)
G2=C2 (zero mode·100) +(one mode·011)·(count $N-2$)
G3=C2 (zero mode·000) +(one mode·111)·(count $N-3$)
G6=C2 (zero mode)·(001+111) +one mode (110+000)·(count $N-3$)
G7=C2 (zero mode)·(011+101) +(one mode)(100+010)·(count $N-2$)
G11=C2 (zero mode)·(010+110) +(one mode)(101+001)
G12=C2 (zero mode)·(100+101+011) +(one mode)(011+010+100)·(count $N-2$)
G13=C2 (zero mode)(000+001+111) +one mode (111+110+000)(count $N-3$)

The above logical equations indicated the operation of the decoding gates to provide the G signals in accordance with the clock signals, the mode signals, the least-significant three characters registered in the multiplier register R5, and the state of the counter 32 (N being the full count thereof). When the counter 32 contains a full count, i.e., a number of shifts equal to the number of characters in the multiplier, a signal is applied through a line 42 to a product output gate 44 which permits the partial product accumulation signals (now representing the complete product) to appear in a cable 46.

At a time when the counter 32 registers $N-2$, i.e., a full count less 2, shifts of no greater than two characters are permitted. Similarly, if the counter has reached $N-3$, i.e., three counts are left, then the counter will permit only three shifts. Thus, the counter 32 functions to prevent the multiplier and the accumulation of products from being shifted to a greater extent than the number of characters in the multiplier number. This control is effected in accordance with the equations set forth in the above table.

The signals from decoding gates D2 are connected to gate circuits interconnecting the registers R1 and R2 and the registers R4 and R5, which gate circuits are identified by a symbol similar to the signal received. The shift effected by the gates is indicated by the number of boxes in the gate. For example, the signal G1 is connected to a gate circuit G1 between the registers R1 and R2. Upon the gate circuit G1 receiving a pulse indicating the signal G1, along with a clock signal C2, the entire content of the register R1 is transferred through the gate circuit G1 to the register R2, and a one digit shift (to the right) is imparted to the binary signals (one box). Of course, the gate G1 actually comprises a rather complex network; however, coincidence gate circuits are very well known in the prior art, and the manner of interconnecting a plurality of gate circuits between a pair of parallel registers whereby a one (or any number) position shift is imparted to the signals is a well known technique in the electronic computer art.

In addition to the gating networks considered above for transferring representative parallel signals between the registers R1 and register R2, gating circuits G4 and G5 are also provided and serve to control the transfer of the signals from the register R2 to the register R1. The passage of the signals through the gating system G4 is a simple transfer from one register to the other; however, the gating system G5 includes a complementing system which serves to invert or alter the state of the two-state binary signals comprising the numerical representation. The binary signals are transferred through the parallel paths of the gate circuit G5 when a subtraction is to be performed. The gating systems G4 and G5 are qualified by pulse signals, similarly designated, from a system of decoding gates D1. The system of decoding gates D1 is connected to receive signals indicative of the two least-significant digits registered in the register R4. The signals received by the system of decoding gates D1 are employed to form signals G4, G5 and G14 (connected between registers R4 and R5) in accordance with the logical equations set out below:

*Decoding Gates D1*

G4=(zero mode)·(00+01+10)
+(one mode)·(11+10+01)C1
G5=zero mode·(11)+(one mode)·(00)C1
G14=C1

It is to be noted, that the system of decoding gates D1 in addition to providing the signals G4 and G5 for controlling the transfer of signals from the register R2 to R1 also provides a signal G14 which serves to control the transfer of signals from the register R4 to the register R5. Of course, the signals G11, G12 and G13 from the system of decoding gates D2 serve to control the gate systems G11, G12 and G13, for effecting the transfer of a binary represented numerical value from the register R5 to the register R4.

An understanding of the illustrative system of the present invention may now best be effected by assuming an exemplary multiplication and explaining the steps thereof when performed by the system of FIGURE 2. The numerical example is the multiplication of:

001101 × 101101 = 001001001
13 × 45 = 585

The steps in performing the above multiplication in the system of FIGURE 2 are set out in a chart comprising FIGURE 3 which shall be referred to along with FIGURE 2 throughout the following description.

The chart of FIGURE 3 includes a plurality of columns which are identified in the figure. However, generally, the second column indicates the value of the variously-changed multiplier which is shifted back and forth between the registers R4 and R5 as indicated in column 1. The third column indicates the instruction which results from observing the less-significant digits of the multiplier. The fifth column indicates the value of the accumulation of partial products which is transferred between the registers R1 and R2 as indicated in column 4. The last column indicates the mode of operation in which the system is currently functioning.

The initial operation in the exemplary multiplication is the entry of the multiplier and multiplicand in the appropriate registers. The multiplicand, 101101, is entered in the register R3 through the cable 16. The multiplier, 001101, is entered in the register R5 via the cable 30. The value in register R5 is indicated to be so registered in the first line of FIGURE 3. With the values so registered, the clock generator 14 is started to initiate the multiplication operation. Of course, various other timing systems may be employed to provide various time intervals for the operations involved.

The three least-significant digits of the multiplier registered in the register R5 are applied as electrical signals to the decoding gates D2 and there decoded to determine the next operation. These digits are 101, and in view of the fact that the system always begins with the mode binary 34 set to indicate zero mode of operation, reference to the chart set out above indicates that 101 commands an addition of the multiplicand to the accumulation of partial products, and a shift of two digits as indicated in the third column of FIGURE 3. Reference to the chart setting forth the logical equations of the decoding gates D2 indicates that the digit signals 101 serve to qualify the gate circuit G7 when the system is in a zero mode. Therefore, the multiplicand from the register R3 (101101) and the content of the register R1 (zero) are passed respectively through the cables 20 and 24 to be additively combined by the parallel adder 22 and passed through the gating system G7 to receive a two order shift (indicated by the two blocks of the gate G7) and thereafter entered in the most-significant digit positions of the register R2. This adding and shifting operation is indicated in the next three lines of the chart.

Simultaneously with the operation described above, the gate system G12 is qualified causing the multiplier to pass from the register R5 to the register R4 and incur a two-position shift to the right, again as indicated in FIGURE 3.

The register R4 now contains all zeros except for two ones in the least-significant digit locations. The decoding gates D1 therefore receive signals indicative of one digits and in accordance with the logical equations thereof (set forth above) form a pulse signal G5. The occurrence of a pulse signal G5 qualifies the gate system G5 causing the value registered in the register R2 to pass through the gating system G5 and associated cable to the register R1 and thereby become complemented (ones changed to zeros and zeros changed to ones) as indicated in FIGURE 3.

The decoding gates D1 also form a pulse signal G14 at the time of clocking signal D1; therefore, the numerical value registered in the register R4 is transferred back to the register R5 through the gating system G14 and associated cable.

The content of the three least-significant digit locations of the register R5 is now 011. This numerical value is applied both to the mode gate 36 and the decoding gates D2. On application to the decoding gates D2, the value produces pulse signals G7 and G12 thereby qualifying the gate circuits G7 and G12. Furthermore, the appearance of the numerical value 011 in the decoding gates D2 serves to form the pulse signals G7 and G12. Therefore, the content of the register R1 along with the multiplicand from the register R3 is added by the parallel adder 22 and passes through the gate circuit G7 to the register R2. It is to be noted, that on the occurrence of pulse signal G5 during the preceding operation, a monostable multivibrator circuit 50 was set to provide a high signal to the parallel adder 22 in the least-significant digit position thereby completing the complementation of the accumulation of partial products registered in the register R1.

Therefore, the operation indicated at 52 in FIGURE 3 is performed along with the shifting operation indicated at 54 to result in the value 55 being registered in the register R2.

Simultaneously with the above operation, the content of the register R5 is transferred to the register R4 through the gating system G12 and a two-digit shift is imparted to the value resulting in all zeros in the register R5. Upon sensing all zeros in the least-significant two digit positions of the register R4, the decoding gates D1 form the signal G5 at a high value as indicated in the above logical equations, thereby qualifying the gate circuit G5 and pulsing the multivibrator 50. Therefore, the content of the register R2 is transferred in a complemented fashion through the gate circuit system G5 to the register R1 to provide the number 58 in the register R1 as indicated in FIGURE 3. Simultaneously, the zero content of the register R4 is transferred back to the register R5 through the gate system G14.

The zeros in the register R5 are next sensed by the decoding gates D2 along with the fact that the system is in a one mode, and would normally form the signal G6 at a high value indicating the operation of adding and shifting three. However, the counter 32 has an overriding effect upon the formation of the signal G6 in that it indicates that only two shifts remain to completely shift the multiplier from the register R5. Therefore, only two shifts may be imparted to the contents of the register R5 as well as the contents of the register R1. As a result, the gate circuit system G7 is qualified which performs the same operation as the gate circuit system G6 with the exception that only a two digit-position shift is incurred.

The zeros in the least-significant digit positions of the register R5 are also detected by the mode gate 36 to indicate that the mode should be changed back to a zero mode. This operation is performed by pulsing the mode binary 34 thereby returning the circuit to indicate the zero mode.

The formation of the signals G7 and G12 at a high value results in the transfer of the multiplier from the register R5 through the gating system G12 to the multiplier register R4, thereby indicating that the total number of digits in the multiplier have been shifted out; while the content of the register R1 is again added to the multiplicand by the adder circuit 22 along with a digit in the least-significant position from the multivibrator 50 to result in the numerical value 60 which is shifted two digit positions producing the numerical value 62. The numerical value 62 may be seen to comprise the answer to the assumed multiplication. The fact that the counter 32 has now counted the requisite number of shifting operations causes the counter 32 to provide a high signal in the line 42 thereby qualifying the product output gate 44 and enabling the content of the registers R2 and R1 to appear in the cable 46. In view of the fact that the content of the register R1 was cleared by the timing signal C2 this register contains entirely zeros. However, the value 62 as indicated in FIGURE 3, is contained by the register R2 and is transferred through the product output gates to the cable 46.

It may therefore be seen, that the system of the present invention operates to rapidly perform multiplication operations by increasing the number of shift operations and reducing the number of addition operations. Furthermore, the system of the present invention is capable of economic construction and manufacture.

While the system of the present invention shown and described herein is fully capable of achieving the objects and advantages stated herein, it will be realized that various other systems are capable of considerable rearrangement and modification without departing from the spirit of the invention. For this reason, the invention is not to be limited to the precise form and arrangement shown and described, but rather to the scope of the appended claims.

I claim:

1. A system for multiplying first and second numerical values, each represented by a plurality of "one" and "zero" binary signals comprising: a first register for registering said first numerical value; means for progressively scanning said second numerical value to simultaneously sense a plurality of binary signals representing a portion of said second numerical value; accumulating means for adding said first value from said first register in shifted significance to accumulate a product value; means for subtracting said first value from said first register in shifted significance from said product value; and control means including a register for determining the shift state of said first value and for repeatedly activating either said accumulating means or said means for subtracting, in accordance with said plurality of binary signals, whereby to develop signals representative of said product value coinciding to the product of said first and second numerical values.

2. A system according to claim 1 wherein said means for scanning comprises means for simultaneously sensing a group of said binary signals, which group sequentially includes said binary signals from least-significant to more-significant in said second numerical value.

3. A system for multiplying first and second numerical values, each represented by a plurality of "one" and "zero" binary signals comprising: first register means for registering signals of said first numerical value; second register means for registering signals of said second numerical value and including means for shifting such signals therein to preserve the more-significant signals; third register means for registering signals representing the product of said numerical values and including means for shifting such signals therein to preserve the more-significant signals; arithmetic means for adding and subtracting signal-represented numerical values in parallel to the value registered in said third register means; and control means including register means to sense simultaneously a plurality of signals registered in least-significant portions of said second register means for controlling said means for shifting and for causing the value in said first register means to be selectively added to and subtracted from the content of said third register means by said arithmetic means, to develop signals representative of the final product of said numerical values in said third register means.

4. Apparatus according to claim 3 wherein said first and third register means each comprise a pair of multistage registers interconnected by a plurality of paths which are differently connected between said registers.

5. Apparatus according to claim 4 wherein said arithmetic means is connected in certain of said paths of said first register means and wherein said control means comprises means for selectively allowing signals to pass through predetermined of said paths.

6. A system for forming binary product signals representative of the product of a first number represented by first binary signals and a second number represented by second binary signals, comprising: a first register for registering said first signals; a second register for registering said second signals; a third register for receiving and registering said product signals; add means for forming signals in said third register representative of the sum of the value in said third register and the value in said second register; subtract means for forming signals in said third register representative of the difference between the value in said third register and the value in said second register; shift means for shifting the contents of said first register and said third register to less-significant digit locations therein; a binary mode register for manifesting one of two modes of operation by mode signals; means for simultaneously sensing plural of said less-significant digit locations of said first register, and connected to receive said mode signals to form a plurality of control signals including a control signal for said mode register; and control means for selectively and repeatedly activating said shift means, said add means, and said subtract means in accordance with said control signals to develop said product signals in said third register.

7. A system for forming binary product signals representative of the product of a first number represented by first binary signals and a second number represented by second binary signals, comprising: a first register for registering said first signals; a second register for registering said second signals; a third register for receiving and registering said product signals; add means for forming signals in said third register representative of the sum of the value in said third register and the value in said second register; shift means for shifting the contents of said first register and said third register to less-significant digit locations; complementing means for complementing the value contained in said third register; a binary mode register for manifesting one of two modes of operation by mode signals; means for simultaneously sensing plural of said less-significant digit locations of said first register, and said mode register to form a plurality of control signals including a control signal for said mode register; and control means for selectively and repeatedly activating said complementing means, said add means and said shift means in accordance with said control signals whereby to develop said product signals in said third register.

8. A system for multiplying first and second numerical values, each represented by a plurality of "one" and "zero" binary signals comprising: a first register having plural stages for registering said first numerical value as a set of first binary signals; a second register for registering said second numerical value as a set of second binary signals; a binary mode register for providing an electrical signal indicative of a first mode and a second mode; means connected to receive a changing plurality of said second binary signals from less-significant to more-significant, during progressive stages of operation for controlling said mode register in accordance therewith; means for shifting the contents of said second register during said first mode upon encountering a "zero" in the least-significant stage thereof; means for adding the contents of said first register in shifted significance to the contents of said accumulator during said first mode upon encountering a "one" in the least-significant stage thereof; means for shifting the contents of said second register during said second mode upon encountering a "one" in the least-significant stage thereof; and means for subtracting the contents of said first register in shifted significance from the contents of said accumulator during said second mode upon encountering a "zero" in the least-significant stage thereof to thereby develop signals representative of the product of said first and second numerical values in said accumulator.

References Cited in the file of this patent

UNITED STATES PATENTS

| | | |
|---|---|---|
| 2,590,599 | Evans | Mar. 25, 1952 |
| 2,942,780 | Dickinson | June 28, 1960 |
| 3,069,085 | Cooper et al. | Dec. 18, 1962 |